Patented Apr. 4, 1939

2,153,302

UNITED STATES PATENT OFFICE 2,153,302

SAPONIFICATION OF OXIDIZED HYDRO-CARBONS

Frederick J. Ewing, Pasadena, Calif., assignor to Union Oil Company of California, Los Angeles, Calif., a corporation of California No Drawing. Application January 4, 1937,
Serial No. 119,003

11 Claims. (Cl. 260—452)

The present invention relates to the oxidation of hydrocarbons, and more particularly pertains to the production of new and useful products resulting from the liquid phase oxidation of petroleum hydrocarbons. In one of its narrower senses or scopes, the invention relates to the treatment of products of reaction resulting from the liquid phase oxidation of petroleum hydrocarbons with oxygen or an oxygen-containing gas, said treatment causing the separation or isolation of certain oxygenated products having distinctive and valuable characteristics and utilities.

It is well known that the liquid phase oxidation of hydrocarbons gives rise to a wide variety of products embracing unsubstituted carboxylic acids, hydroxy acids, keto acids, aldehyde acids, alcohols, ethers, esters, ketones, lactones, resinous and resinifying materials and a number of other more or less oxygenated products. Also, this liquid phase oxidation, under normal operating conditions, usually leaves some of the hydrocarbons in an unreacted or uncombined state or condition. It is also known that in the liquid phase oxidation of petroleum fractions there is formed a heterogeneous mass containing most if not all of the above types of more or less oxygenated hydrocarbon products. It is therefore the main object of the present invention to provide a method for treating said products of oxidation to recover or isolate therefrom one or more new and valuable products or fractions having distinctive characteristics and utilities. A further object of this invention is to treat the products of the liquid phase oxidation of predominantly naphthenic petroleum oils, their fractions, and/or distillates, to produce and/or isolate therefrom the aforementioned new and useful products.

As previously stated, the oxidation of a petroleum fraction containing various hydrocarbon constituents produces a mass comprising some unreacted or unoxidized hydrocarbons and a mixture of products which are oxidized to a greater or less extent. At least a portion of these oxygenated products and specifically the various carboxylic acids (whether unsubstituted or substituted) may be easily separated from this heterogeneous mass by a treatment in the cold state with an aqueous alkali solution. The addition of such caustic or alkali causes the saponification of the free carboxylic radical of the acids to form their soaps or salts. These soaps are soluble in the aqueous phase and may be easily separated as by withdrawal of this aqueous phase from the supernatant oil phase. The latter comprises the unreacted or unoxidized hydrocarbons as well as oxygenated products not saponificable by the addition of cold caustic solution. Although the exact composition of these unsaponifiable oxygenated products is not known at the present time, it includes the alcohols, esters, lactones and ethers produced during the aforementioned liquid phase oxidation.

It has now been discovered that these lactones and esters, and possibly some of the other oxygenated products, remaining unsaponified after the treatment of the products of oxidation with cold caustic solution may be converted into new and useful acids having distinctively different characteristics from the carboxylic acids which were originally present in the products of oxidation and which have been removed by the aforementioned saponification in a cold state with dilute caustic or alkali. It has been further discovered that this reaction may be realized by treating said oxygenated products (after the removal of the carboxylic acids as described above, and optionally after the separation and withdrawal of the unoxidized hydrocarbons) with relatively concentrated or strong caustic, with or without the use of heat.

The invention may therefore be broadly stated to reside in carrying out liquid phase oxidation with air or an oxygen-containing gas and at optimum temperatures and pressures of a petroleum hydrocarbon oil, its fraction and/or distillate, to produce a heterogeneous mixture containing unconverted or unoxidized hydrocarbons as well as a wide variety of oxygenated products, treating said heterogeneous mixture in a cold state with dilute caustic alkali to saponify the carboxylic acids and easily saponifiable lactones, removing said saponified materials in the form of their soaps or salts, and treating the esters, difficultly saponifiable lactones and similar oxygenated products remaining in the unsaponified portion of said heterogeneous mass to recover and isolate therefrom new and useful acids. The invention may further be stated to reside in treating the oxygenated products from a liquid phase oxidation of a petroleum hydrocarbon fraction after the removal therefrom of the carboxylic acids, and optionally after the separation of the unoxidized portion of the petroleum hydrocarbons, with strong saponifying agents, such as hot caustic alkali, to convert esters, lactones, and like oxygenated fractions into new and valuable carboxylic acids having high acid numbers and possessing characteristics distinct from those of the carboxylic acids originally present in the oxidized mass and removed therefrom as by saponification in a cold state with dilute caustic or alkali. Obviously, any other method of separation of the carboxylic acids and easily saponifiable lactones is within the scope of this process. Thus, instead of using a cold caustic solution, it is also possible to treat the products of oxidation with a heated dilute alkali solution, said treatment being only sufficient to saponify the above products, but not the esters, etc., which are then to be treated as described herein.

For purposes of exposition, the various phases of the invention will be discussed at greater length in connection with the description of the preferred method of operation.

As previously stated the oxidation of a petroleum fraction produces a mixture containing some unreacted or unoxidized hydrocarbons and a heterogeneous mass comprising the products of oxidation and including unsubstituted carboxylic acids, hydroxy acids, keto acids, aldehyde acids, alcohols, ethers, esters, lactones, ketones, resinous and resinifying materials and other more or less oxygenated fractions. In the statement of the invention it was pointed out that the various unsubstituted and substituted carboxylic acids may be removed from this heterogeneous mixture by saponifying said acids in a cold state with dilute caustic alkali, the unsaponified fraction being then treated for the conversion of the esters and lactones present therein into the acids constituting the main object of the present invention. In actual operation however, it has been found that a somewhat different method of operation is preferable and has certain advantages which will be more fully realized from the following description. Thus the aforementioned heterogeneous mixture obtained by the liquid phase oxidation of said petroleum hydrocarbons vary in their solubility in the hydrocarbon fraction treated as well as in the various oxygenated products produced to such an extent that two phases are formed. Broadly stated the more highly oxidized products as well as certain inherently insoluble products, such as glycols and certain polyhydric alcohols are the least soluble, and their gradual formation during the progress of the oxidation is accompanied by their precipitation out of solution particularly when the aforementioned heterogeneous mixture is cooled. This relatively heavier phase which contains only minor amounts of unoxidized hydrocarbons is referred to hereinafter as the "oil insoluble fraction." The relatively less oxidized products are found dissolved in each other and in the unreacted or unoxidized hydrocarbons and comprises the "oil soluble phase" or "oil soluble fraction." It is thus clear that the two phases preferably mentioned hereinabove, may be easily separated one from the other by cooling the products of reaction and decanting the oil soluble phase.

As previously stated the oil insoluble phase contains the comparatively highly oxidized acids as well as some of the inherently oil insoluble oxygenated products of the polyhydroxy alcohol type. This phase may be separated into two distinct fractions by extracting the oil insoluble phase with benzene or a similar compound. The benzene insoluble phase contains most of the soaps of the catalyst employed in the original liquid phase oxidation step. Thus, if magnesium oxide were to be used as the catalyst during the oxidation the benzene insoluble phase produced by the extraction of the oil insoluble phase with benzene would contain magnesium soaps. Also, this benzene insoluble phase includes or comprises certain benzene insoluble acids, the exact composition of which is not known at the present time.

As to the oxygenated products extracted by use of benzene as the solvent, these include certain hydroxy acids, resin-forming acids as well as some alcohols, glycols and a small percentage of unconverted or neutral hydrocarbons. To separate the acids from these comparatively less oxygenated or unoxidized products the aforementioned benzene soluble phase may be treated in a cold state with dilute alkali such as a sodium hydroxide solution. This operation may be carried out either in the presence of the benzene solvent or after its removal as by distillation. The soaps or salts of the acids formed by the caustic treatment, being water soluble, are found in an aqueous phase, the unreacted or unsaponified portion being removed as by decantation. In view of the fact that the saponification causes emulsification of the two phases the unsaponified fraction may be preferably extracted from the soap solution by using a suitable solvent of the type of ethyl ether. The soap solution may then be further treated for the recovery of the benzene soluble acids and resin acids, this operation being realized by acidification of the soap solution, and the distillation of the liberated acidic fraction.

Referring now to the oil soluble phase obtained by the decantation of the heterogeneous mixture produced by the liquid phase oxidation of the petroleum oil oxidized, this phase, besides the unreacted or unoxidized hydrocarbons contains a large variety of various more or less oxidized products. As outlined above, the unsubstituted and substituted carboxylic acids present in this phase may be isolated by treating the oil soluble phase with a cold dilute caustic or alkali solution, the carboxylic acids being converted thereby into their various soaps or salts. The aqueous soap solution thus formed may be separated as by decantation and may be washed with a solvent such as ethyl ether or the like to remove therefrom any unsaponified materials occluded therein. As in the case of the benzene soluble acid soaps, the soap solution produced by the saponification of the carboxylic acids present in the oil soluble phase may be similarly liberated as by acidification and may be further treated to recover and/or isolate the various acids. Thus, the acidified fraction may be solvent extracted to remove the resinous acids. The soluble acids may further be vacuum distilled to recover acids which have distinct characteristics similar to those of naphthenic acids.

The above outline of steps of separation of the products of oxidation results in an economical and an advantageous separation of the unsubstituted and substituted carboxylic acids from the original heterogeneous mass. The substances thus remaining include the unreacted hydrocarbons as well as the various alcohols, esters, lactones, ethers, lactides, etc. It is from this mixture that the new and distinct acids may be recovered and isolated according to the present invention. This recovery as outlined above may be carried out by treating the mixture with strong caustic preferably at elevated temperatures. This treatment causes the splitting of the esters and lactones to form carboxylic acids on one hand and alcohols, etc. on the other. If the treatment is carried out on the whole original unsaponified mass still containing the unreacted hydrocarbons (but after the removal of the carboxylic acids) the treatment with strong caustic at elevated temperatures, which treatment will be hereinafter broadly termed "hot saponification", may be followed by decantation to remove the aqueous soap solution. This soap solution may then be acidified in the well known manner, as by the addition of optimum quantities of a mineral acid to recover the new and distinctive carboxylic acids not present as such in the original mixture produced by the liquid phase oxidation. The oil phase separated from the soap solution may, if desired, be treated with a selective solvent to separate the unreacted hydrocarbons from the alcohols, ethers, etc., which are not saponifiable even by the hot saponification treatment. As a modification, the unreacted hydrocarbons may first be removed from the mixture, this step being then followed by the hot saponification of the mixture of the products oxidized to a greater or less extent, the soaps thus formed being then acidified as described above.

As an example of one of the preferred methods of realizing the process constituting the object of the present invention, a kerosene fraction consisting substantially solely of naphthenic hydrocarbons and having an average gravity of 34.6° A. P. I., an initial boiling point of 417° F. and an end boiling point of 585° F., was oxidized at a temperature of 280° F. in a liquid phase and in the presence of approximately 0.1% of copper naphthenate as the catalyst. The oxidation was carried at substantially atmospheric pressure for a period of 88 hours by passing air through the charging stock at the rate of 10 liters per hour. This extensive oxidation caused the formation of the various more or less oxygenated oxidation products of which approximately 45% were of the above described oil insoluble type. Of this fraction a very small percentage was found to be completely insoluble even in the hot products of oxidation, this small fraction being highly friable and resembling a very black dry coke. Upon extraction of the oil insoluble phase with benzene or acetone the fraction soluble in said solvent had a reddish brown appearance, was liquid at approximately 200° F. but solid and moderately friable and sometimes soft and tacky at ordinary room temperatures. The acid number of this fraction ranged from approximately 84 to 97 while the saponification number was between about 300 and 320. Upon neutralization with cold dilute caustic or alkali approximately 70% of this fraction was converted into soaps. The remaining unsaponifiable phase consisting primarily of unreacted hydrocarbons and oxygenated products not saponified by the above cold caustic treatment, such as esters, certain lactones, ketones, ethers, alcohols, and the like.

The oil soluble phase was extracted with aqueous cold sodium hydroxide solution to convert the acids therein into their respective soaps or salts. Upon reacidification to liberate the acids these latter constituted about 26.5% of the oxidized materials or approximately 4.6% of the original oil oxidized. These acids consisted primarily of unsubstituted acids with the possible presence of some resin-forming and/or hydroxy acids, the fraction having an acid number of about 188 and a saponification number of 322.

The oil soluble phase remaining after the above described cold saponification as well as the small percentage of oxygenated products remaining after the cold saponification of the benzene soluble acids, were then treated with an alcohol solution of potassium hydroxide. In the instant case the saponification was carried out at reflux temperatures, i. e. the boiling point of the alcohol employed. However, it is obvious that with different charging stocks as well as when using reagents of comparatively less causticity the saponification of this fraction should be realized at elevated temperatures. The soaps thus formed were separated as the aqueous phase from the remaining unreacted hydrocarbons as well as from the less oxygenated unsaponifiable products, such as the alcohols. Upon acidification to liberate the acids in said soaps, these acids were found to be of a clear red color. The acids were liquid or at the most slightly viscous at room temperatures. They had an acid number of from 136 to 156 and a saponification number of between 188 and 218. A comparison of these acids with those recovered from the other fractions and particularly when compared to the carboxylic acids recovered by cold saponification from the oil soluble phase clearly indicates that these acids are distinctive in character. The fact that these acids have the highest ratio of acid number to saponification number as well as the fact that the esters from which they are derived are oil soluble but not saponifiable when treated with cold caustic, leads one to believe that these acids were originally present in the oxidized mixture as unsubstituted or simple acid esters of the alcohols.

The acids recovered by the above-described process of saponifying the products unsaponified by cold caustic, have various utilities. Thus, their metallic salts are suitable as paint driers. Also, the soaps of these salts find a number of uses in the industries.

It is to be noted that the above disclosure shows that the new and useful acids are liberated or extracted from the mother liquor by a "hot saponification." This is due to the fact that the saponification of esters with cold alkali solutions is so slow that it is substantially not noticeable. On the other hand, these same esters become saponified in a comparatively short period of time when contacted with alkalies at higher temperatures. In view of the fact that esters do not dissolve in water, the use of an aqueous alkali solution, even at higher temperatures, is undesirable since saponification occurs only at the interphase. For this purpose, it is proposed to use an alcoholic solution of the alkali, such as an alcohol solution of potassium hydroxide. It is obvious, however, that the alkali may be in solution in any other medium which will act as a mutual solvent for the alkali and the esters, etc., being saponified.

As to the selective solvents to be used for the removal of the unreacted or unoxidized hydrocarbons either prior or subsequent to the hot saponification step, it is obvious that any solvent which will dissolve the products of oxidation in preference to the unreacted hydrocarbon fractions may be used. Thus, ethyl alcohol, acetone, sulfur dioxide, or mixtures thereof, or any of their equivalents, may be advantageously employed. Clearly, any other method of or means for the separation of these oxidized products from the unreacted constituents may be substituted for and considered an equivalent of the above described solvent extraction step.

The acid numbers and saponification values given herein refer to the number of milligrams of potassium hydroxide necessary to neutralize or saponify, respectively, one gram of the material.

Although the present disclosure was given in connection with a specific example, it is obvious

I claim:

1. In a process for treating products of liquid phase oxidation of hydrocarbons the steps of separately removing easily saponifiable compounds consisting of the carboxylic acids and the easily saponified lactones present in said products of oxidation and treating the remaining products of oxidation with alcoholic alkali solution to recover therefrom an acidic fraction having a high ratio of acid number to saponification value.

2. In the process for treating products of liquid phase oxidation of hydrocarbons, the steps of converting the carboxylic acids and easily saponifiable lactones present in said products of oxidation into their soaps and salts, separating the soaps and salts thus produced from the unsaponified products of oxidation and alkali treating said unsaponified fractions with an alcoholic alkali solution to recover therefrom an acidic fraction having a high ratio of acid number to saponification value.

3. In a process according to claim 2 wherein the conversion of the carboxylic acids and lactones into their soaps is carried out by contacting the products of oxidation with an aqueous alkali solution.

4. In a process for treating products of liquid phase oxidation of petroleum fractions derived from naphthenic and asphalt base crude oils, the steps of commingling said products of oxidation with cold alkali solution to convert the carboxylic acids and easily saponifiable lactones present in said products of oxidation into their soaps and salts, separating said soap solution from the unsaponified products of oxidation, treating said unsaponified products of oxidation to isolate therefrom the ethers, esters, difficulty saponifiable lactones and similar oxygenated products, contacting said isolated materials with a strong alcoholic alkali solution to convert said isolated oxygenated materials into their soaps and salts, and treating said soaps and salts to liberate therefrom an acidic fraction of a high ratio of acid number to saponification value.

5. In a process according to claim 4 wherein the esters, ethers and similar oxygenated products are extracted from the unsaponified products of oxidation by extracting said products of oxidation with a selective solvent having preferential solvent characteristics for said products.

6. A process for treating products of liquid phase oxidation of naphthenic petroleum fractions which comprises commingling said products of oxidation with an alkali solution to convert the easily saponifiable carboxylic acids and lactones into their respective salts and soaps, separating said soap solution from the unsaponified products of oxidation, commingling said unsaponified fraction with an alcoholic alkali solution to convert the esters, ethers and similar oxygenated fractions into their soaps, separating the soaps thus produced from the unsaponified fraction and contacting said soaps with a mineral acid to recover an acidic fraction having a high ratio of acid number to saponifiable value.

7. In a process according to claim 6 wherein the treatment of the unsaponified fraction with the alcoholic alkali solution is realized at an elevated temperature to aid in the saponification of the esters, ethers and similar oxygenated products.

8. A process for treating products of liquid phase oxidation of naphthenic petroleum fractions which comprises commingling said products of oxidation in a cold state with an aqueous alkali solution to convert the easily saponifiable carboxylic acid and lactones into their respective salts and soaps, separating said soap solution from the unsaponifiable products of oxidation, commingling said unsaponifiable fraction with an alcoholic alkali solution, keeping said mixture to the alcohol reflux temperature to convert the esters, ethers and similar oxygenated fractions into their soaps, separating the soaps thus produced from the unsaponified fraction, and contacting said soaps with a mineral acid to recover an acidic fraction having a high ratio of acid number to saponification value.

9. A process for treating products of liquid phase oxidation of naphthenic petroleum fractions which comprises commingling said products of oxidation with dilute alkali solution to convert the easily saponifiable carboxylic acids and lactones into their respective salts and soaps, separating said soap solution from the saponifiable products of oxidation, isolating the ethers, esters, difficultly saponifiable lactones and similar oxygenated products from said unsaponified products of oxidation, contacting said isolated materials with strong alcoholic alkali solution to convert said isolated oxygenated materials into their soaps and salts, and treating said soaps and salts to liberate therefrom an acidic fraction having a high ratio of acid number and saponification value.

10. In a process according to claim 9, wherein the isolation of the esters, ethers and similar oxygenated products is realized by treating the products of oxidation remaining after the aqueous alkali treatment with a solvent selected from the group consisting of the alcohols, acetone and sulfur dioxide.

11. In a process according to claim 9, wherein the treatment with the alcoholic alkali solution is realized at an elevated temperature.

FREDERICK J. EWING.